United States Patent
Okamoto et al.

(10) Patent No.: US 6,731,472 B2
(45) Date of Patent: May 4, 2004

(54) SUSPENSION FOR DISC DRIVE

(75) Inventors: Hiroshi Okamoto, Yokohama (JP);
Koji Uozumi, Isehara (JP); Masao Hanya, Yokohama (JP); Tetsuya Fujiwara, Yokohama (JP); Toshio Shiigi, Yokohama (JP); Kenichi Takikawa, Aiko-gun (JP); Osamu Iriuchijima, Yokohama (JP)

(73) Assignees: NHK Spring Co., Ltd., Yokohama (JP); Hitachi, Ltd., Tokyo (JP)

( * ) Notice: Subject to any disclaimer, the term of this patent is extended or adjusted under 35 U.S.C. 154(b) by 117 days.

(21) Appl. No.: 09/803,849

(22) Filed: Mar. 12, 2001

(65) Prior Publication Data

US 2001/0043443 A1 Nov. 22, 2001

(30) Foreign Application Priority Data

May 22, 2000 (JP) .................................. 2000-150004
Mar. 7, 2001 (JP) .................................. 2001-063010

(51) Int. Cl.⁷ ................................................ G11B 5/58
(52) U.S. Cl. .................................. 360/294.3; 360/244.5
(58) Field of Search ........................ 360/294.8, 294.9, 360/244.5, 244.6, 294, 294.1–294.7

(56) References Cited

U.S. PATENT DOCUMENTS

| 4,991,045 A | | 2/1991 | Oberg | |
|---|---|---|---|---|
| 6,046,888 A | * | 4/2000 | Krinke et al. | 360/294.4 |
| 6,157,522 A | * | 12/2000 | Murphy et al. | 360/294.4 |
| 6,198,602 B1 | * | 3/2001 | Vera et al. | 360/244.5 |
| 6,239,953 B1 | * | 5/2001 | Mei | 360/294.6 |
| 6,268,983 B1 | * | 7/2001 | Imada et al. | 360/294.3 |
| 6,351,354 B1 | * | 2/2002 | Bonin | 360/294.6 |
| 6,356,414 B1 | * | 3/2002 | Traskos et al. | 360/244.3 |

FOREIGN PATENT DOCUMENTS

| JP | 60-127578 | 7/1985 |
|---|---|---|
| JP | 2000-182341 | 6/2000 |

OTHER PUBLICATIONS

Masao Hanya et al: "Suspension Design for Windage and High Bandwidth", Conference on Information Intelligence and Precision Equipment (IIP 2000), The Japan Society of Mechanical Engineers, Mar. 24, 2000.

* cited by examiner

Primary Examiner—Brian E. Miller
(74) Attorney, Agent, or Firm—Frishauf, Holtz, Goodman & Chick, P.C.

(57) ABSTRACT

A suspension for disc drive having a micro actuator mechanism comprises a base plate, a connecting plate having a hinge portion thinner than the base plate, a load beam provided with a flexure, a pair of actuator elements such as PZT, etc. The micro actuator mechanism includes a pivot portion formed between a pair of slits and support walls formed on the connecting plate. The actuator elements are provided individually on the opposite sides of the pivot portion. Each support wall is a bent portion that is formed by raising an edge portion of the connecting plate in the thickness direction of the main portion of the connecting plate.

17 Claims, 9 Drawing Sheets

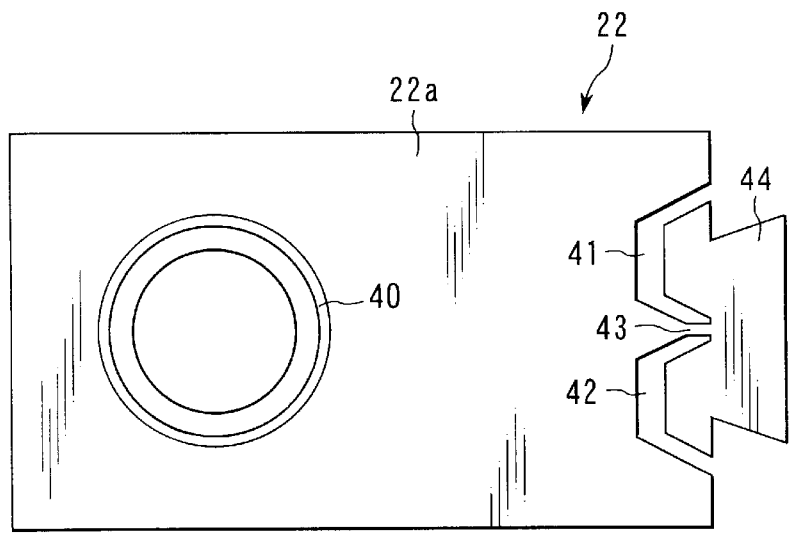
FIG. 2
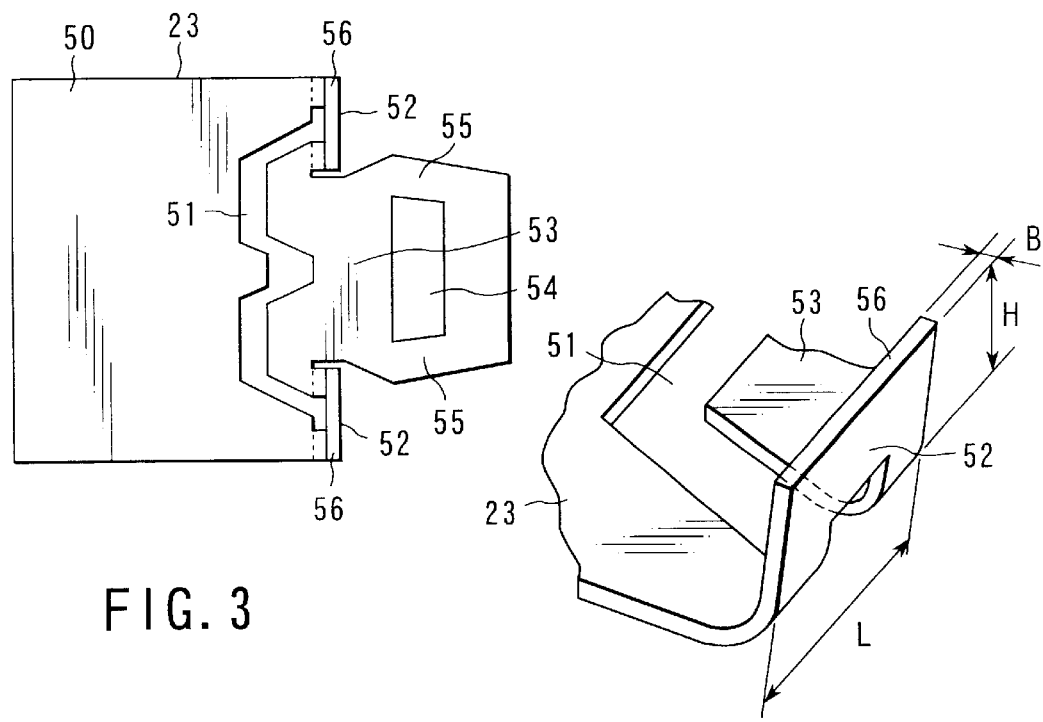
FIG. 3
FIG. 5

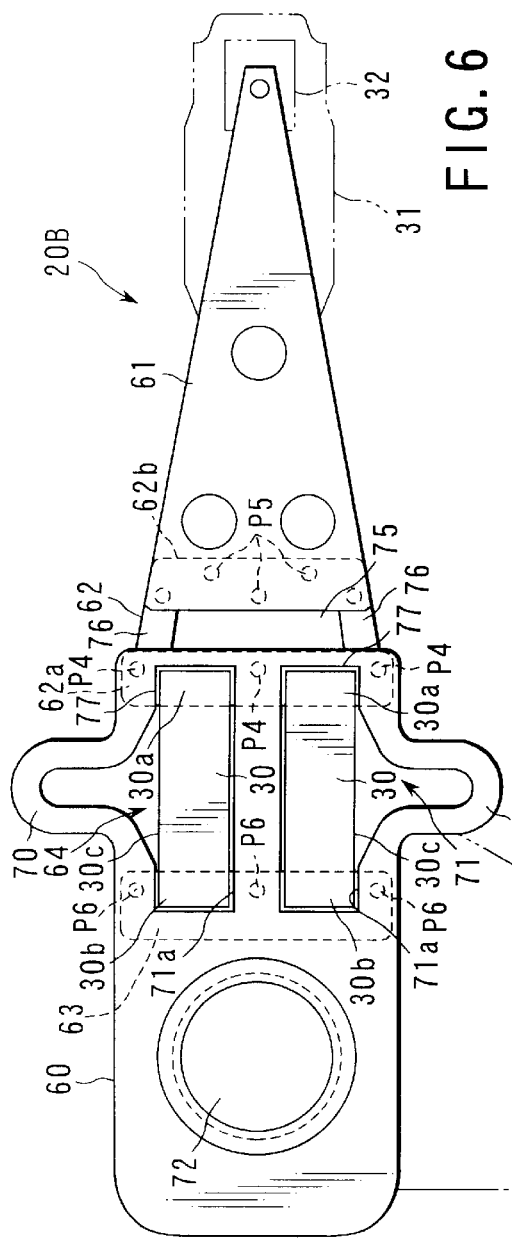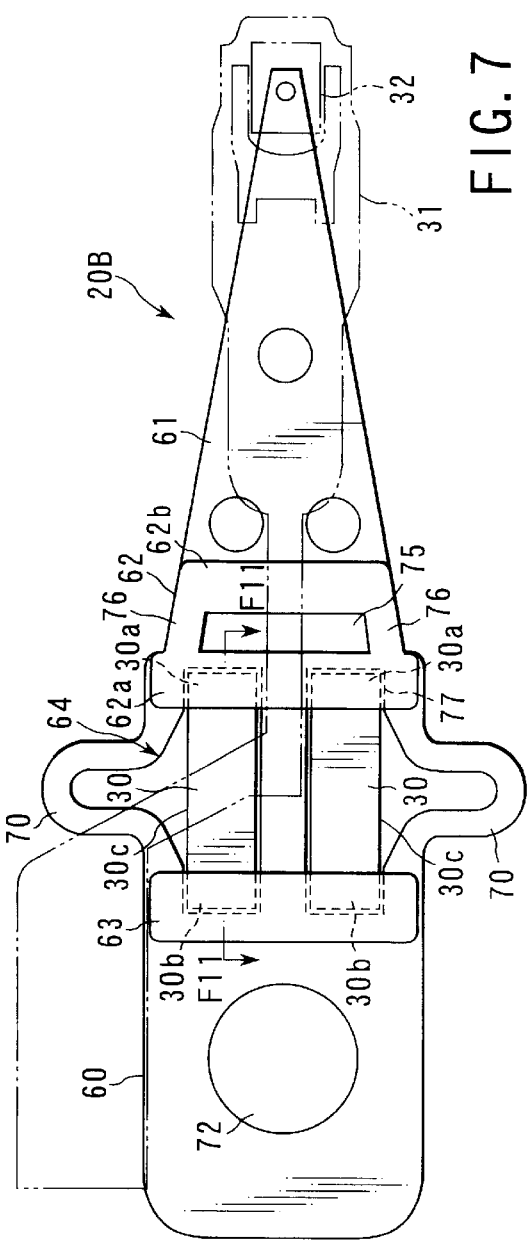

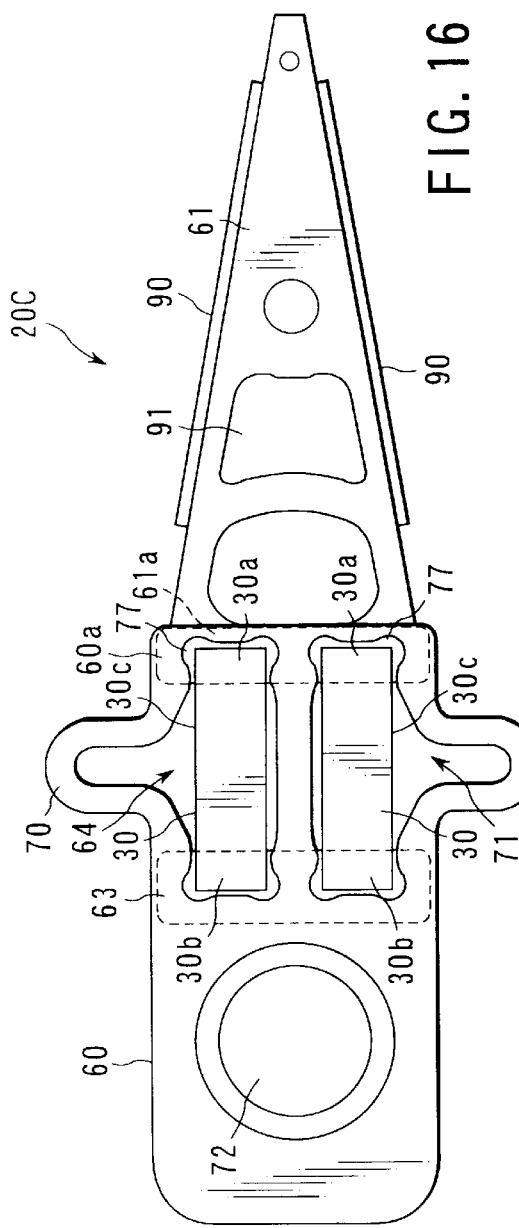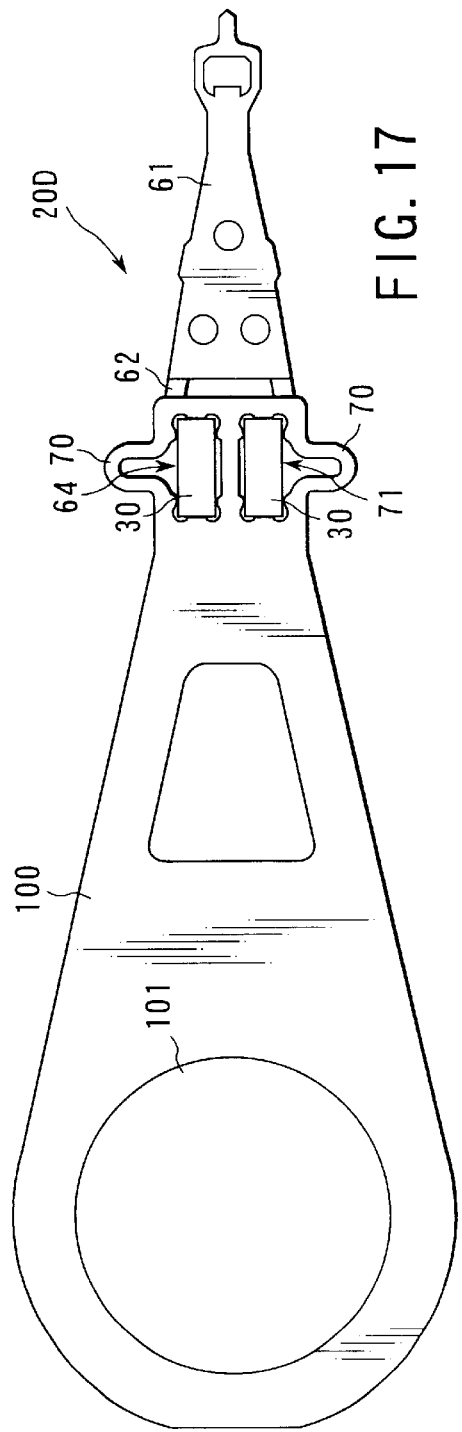

SUSPENSION FOR DISC DRIVE

CROSS-REFERENCE TO RELATED APPLICATIONS

This application is based upon and claims the benefit of priority from the prior Japanese Patent Applications No. 2000-150004, filed May 22, 2000; and No. 2001-063010, filed Mar. 7, 2001, the entire contents of both of which are incorporated herein by reference.

BACKGROUND OF THE INVENTION

The present invention relates to a suspension for disc drive incorporated in an information processor such as a personal computer.

A magnetic head is used to record in or read data from a recording surface of a disc in a disc drive that is provided with a rotating magnetic or magneto-optical disc. The magnetic head includes a slider that is opposed to the recording surface of the disc, a transducer in the slider, etc. As the disc rotates at high speed, the slider is slightly lifted off the disc, whereupon an air bearing is formed between the disc and the slider. A suspension for holding the magnetic head is provided with a load beam, a flexure formed of a very thin plate spring fixed to the distal end portion of the load beam, a base plate on the proximal portion of the load beam, etc. The slider that constitutes the magnetic head is attached to the distal end portion of the flexure.

In a hard disc drive (HDD), the track center of the disc should be subjected to following control for ±10% or less of the track width. Most of modern high-density discs have a track width of 1 μm or less, so that it is hard to keep the slider in the track center. Accordingly, it is necessary to control the position of the slider more accurately as well as, for example, to increase the rigidity of the disc, thereby damping the oscillation.

In general, conventional disc drives are of a single-actuator type such that a suspension is moved by means of a voice coil motor only. According to this type, a lot of resonance peaks exist in a low-frequency band. It is difficult, therefore, to control the slider (head portion) at the distal end of the suspension in a high-frequency band by means of the voice coil motor only, and the bandwidth of servo cannot be increased.

Accordingly, there has been developed a dual-actuator suspension that is provided with actuator elements, such as piezo-electric elements that are formed of PZT (plumb zircon-titanate), as second actuators. According to this dual-actuator system, only the distal end portion of the suspension or the slider is slightly moved in the width direction (so-called sway direction) of the suspension by means of the actuator elements. A movable part that is driven by means of the actuator elements is considerably lighter in weight than that of the single-actuator system, so that the slider can be controlled in a high-frequency band. Thus, the band width of the servo for slider position control can be made several times as high as that of the single-actuator system, and tracking errors can reduced correspondingly.

FIG. 21 shows a part of a conventional dual-actuator suspension. A micro actuator mechanism 2 of this suspension 1 is formed having slits 4 and 5 in its base portion 3. A pivot portion 7 and support walls 8 and 9 are formed on the proximal portion of a load beam body 6. Actuator elements 10 such as PZT are provided individually on the opposite sides of the pivot portion 7.

One end portion 10a of each actuator element 10 is bonded to the base portion 3, and the other end portion 10b to the load beam body 6. When supplied with current, the actuator elements 10 are distorted in opposite directions. The support walls 8 and 9 bend as this distortion causes the distal end portion of the suspension 1 to be displaced in the sway direction (direction indicated by arrow S) around the pivot portion 7. The suspension of this type will hereinafter be referred to as a pivot-type suspension.

In the pivot-type suspension, the stiffness of the support walls 8 and 9 must be lowered in order to obtain satisfactory displacement in the sway direction. In this case, the torsional stiffness of the whole suspension is reduced, and the sway-mode resonance frequency lowers inevitably. In order to solve this problem, it is necessary to reduce length L' and width B' of the support walls 8 and 9 and increase the wall thickness.

Since the support walls 8 and 9 are formed integrally with the base portion 3 and the load beam body 6, however, their width B' can be reduced only limitedly. Further, their thickness is settled distinctly depending on the respective thicknesses of the base portion 3 and the load beam body 6, so that it is hard to increase the thickness of the support walls 8 and 9.

Since the thickness-direction stiffness of the micro actuator mechanism 2 is low, the PZT elements 10 may possibly undergo deformation such as warping as they are bonded to the base portion 3 and the load beam body 6. If the elements 10 are deformed, their output characteristics may change, or accurate control may fail to be accomplished. Since the elements 10 share a high percentage of load on the micro actuator mechanism 2, moreover, they are damaged heavily when shocked. In some cases, therefore, even a relatively small shock can destroy the elements 10.

BRIEF SUMMARY OF THE INVENTION

Accordingly, the object of the present invention is to provide a suspension for disc drive, in which the resonance peak of the suspension with a micro actuator mechanism can be enhanced, and actuator elements can be made less destroyable.

In order to achieve the above object, a suspension according to the present invention comprises an actuator base including a base plate, a load beam provided with a flexure, and a micro actuator mechanism attached to the actuator base, the micro actuator mechanism including at least one pair of slits formed in the actuator base, a pivot portion situated between the slits, an actuator element provided on the actuator base and adapted to be distorted to cause displacement of the distal end portion of the load beam when supplied with current, and a support wall formed of a bent portion rising in the thickness direction of the actuator base from an edge portion of the actuator base.

In the suspension provided with the micro actuator mechanism of a pivot type, according to this invention, the sway-direction resonance frequency can be increased, so that the position of the suspension can be controlled with higher accuracy.

The pivot-type suspension of the present invention comprises a connecting plate for connecting the actuator base and the load beam, the connecting plate including a main plate portion formed of a plate material thinner than the base plate and superposed on the base plate and the support wall rising in the thickness direction of the main plate portion from an edge portion of the main plate portion, for example. According to this invention, the flexibility of the support wall in the sway direction can be secured.

Further, the connecting plate may be formed of a springy material and include a hinge portion flexible in the thickness direction between the base plate and the load beam. According to this invention, the support wall can be formed by utilizing a part of the connecting plate that integrally has the hinge portion. The support wall is composed of the bent portion that is formed at an end of the thin connecting plate. In this case, the thickness of the support wall can be increased depending on the height of the bent portion. Since the bent portion is thin, moreover, the width of the support wall that is formed of the bent portion can be reduced. Thus, the torsional stiffness and the sway-mode resonance frequency can be enhanced without lowering the flexibility the support wall.

Furthermore, a bending-type suspension for disc drive according to the present invention comprises an actuator base including a base plate having a thickness of 0.17 mm or more and formed integrally with a boss portion, a load beam provided with a flexure, and a micro actuator mechanism attached to the actuator base, the micro actuator mechanism including an actuator element adapted to be distorted to cause displacement of a distal end portion of the load beam when supplied with current.

In the bending-type suspension according to this invention, the sway-direction resonance frequency can be increased, so that the position of the suspension can be controlled with high accuracy. In the suspension of this invention, the actuator elements share lighter load. Since the actuator elements can be protected as they are stored in an aperture of the actuator base, moreover, they can be made less destroyable. Since the actuator elements of this invention are of an embedded type, furthermore, they are arranged substantially symmetrically with respect to the thickness-direction center of the base plate. Accordingly, a displacement obtained when the actuator elements are activated can be effectively transmitted to the distal end portion of the suspension.

The suspension of this invention may comprise a conductive member for electrically connecting a wiring portion on the flexure and a connector portion of the actuator element. According to this invention, the wiring portion on the flexure and the connector portion of the actuator element face on the same side, and they are connected electrically to each other by means of the conductive member, e.g., a bonding wire. Thus, the wiring portion of the flexure and the connector portion of the actuator element can be situated substantially on the same plane with each other, so that the conductive member that connects them need not be long, and connecting operation is easy.

The suspension of the present invention having the actuator element stored in the aperture of the actuator base may comprise a springy connecting plate for connecting the base plate and the load beam to each other, the connecting plate including a hinge portion flexible in the thickness direction between the base plate and the load beam. According to this invention, the base plate and the load beam can be joined to each other by means of the connecting plate that integrally has the hinge portion.

The suspension of this invention may comprise a base plate of a long-mount type attached to a voice coil motor and the micro actuator mechanism on the base plate, the base plate being formed of a cladding material that composed of a light metal and a stainless steel. According to this invention, the whole suspension that has the long-mount base plate can be simplified in configuration and reduced in weight.

Preferably, in the present invention, the base plate, which is provided with the micro actuator mechanism, should have a thickness of 0.17 mm or more. According to this invention, the stiffness of the micro actuator mechanism can be enhanced depending on the thickness of the base plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a plan view of a base plate used in the suspension shown in FIG. 1;

FIG. 3 is a plan view of connecting plate used in the suspension shown in FIG. 1;

FIG. 5 is a perspective view of a support wall of a micro actuator mechanism of the suspension shown in FIG. 1;

FIG. 6 is a plan view of a suspension according to a second embodiment of the invention;

FIG. 7 is a bottom view of the suspension shown in FIG. 6;

FIG. 16 is a plan view of a suspension according to a fourth embodiment of the invention;

FIG. 17 is a plan view of a suspension according to a fifth embodiment of the invention;

DETAILED DESCRIPTION OF THE INVENTION

A suspension 20A for disc drive according to a first embodiment of the present invention will now be described with reference to FIGS. 1 to 5.

Figure 1:
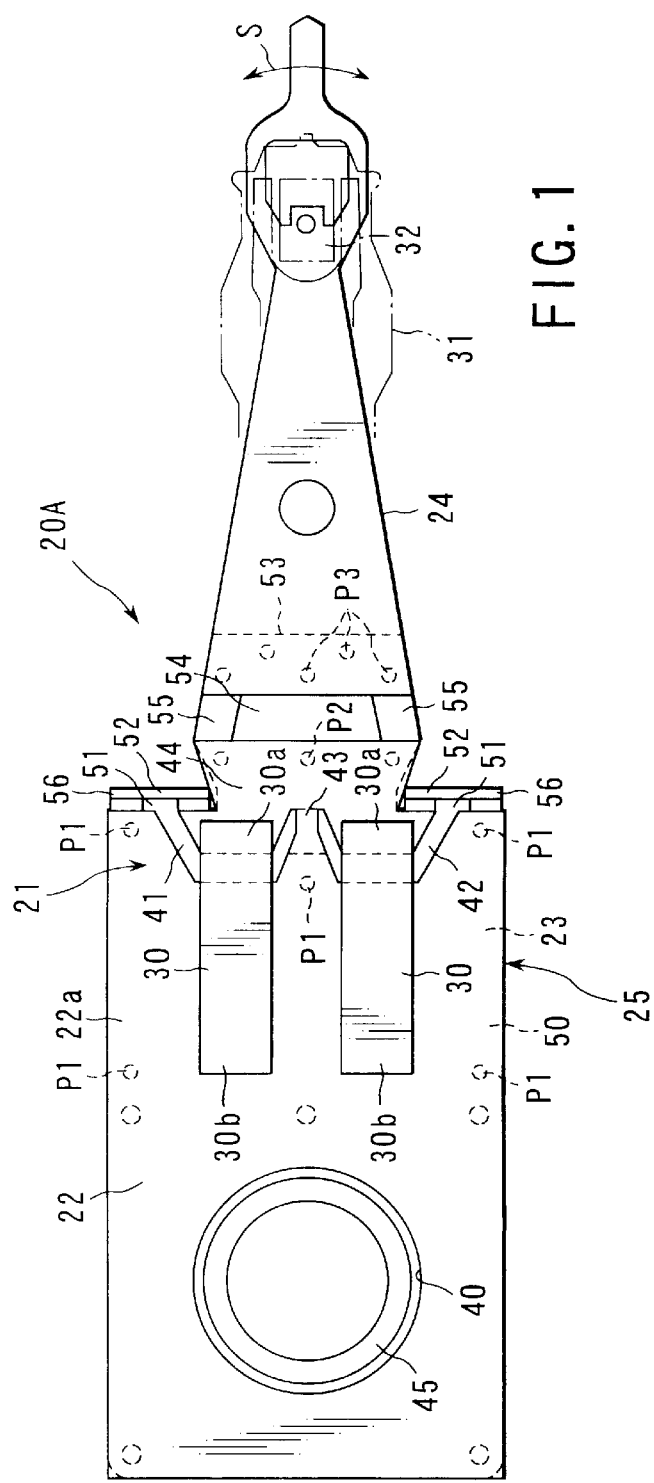
FIG. 1 is a plan view of a suspension according to a first embodiment of the present invention.
Figure 4:
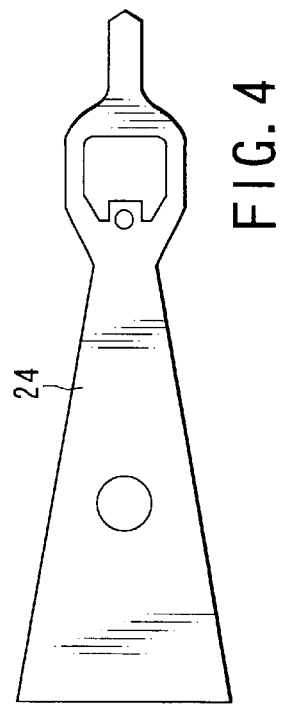
FIG. 4 is a plan view of a load beam used in the suspension shown in FIG. 1.

The suspension 20A of a dual-actuator type shown in FIG. 1 comprises a micro actuator mechanism 21 of a pivot type, a base plate 22 shown in FIG. 2, a connecting plate 23 that serves also as a hinge member shown in FIG. 3, and a load beam 24 shown in FIG. 4. The base plate 22 is fixed to the distal end portion of an actuator arm that is driven by means of a voice coil motor (not shown), and is turned by means of the motor. In this embodiment, overlapping portions of the base plate 22 and the connecting plate 23 constitute an actuator base 25. However, an actuator base may be formed of the base plate 22 only.

The micro actuator mechanism 21 includes a pair of actuator elements 30 that are formed of a piezoelectric element, such as PZT, each. The actuator elements 30 are arranged substantially parallel to each other on the base plate 22. The load beam 24 is provided with a flexure 31, as indicated by two-dot chain line in FIG. 1. The flexure 31 is formed of a metallic precision plate spring that is thinner than the load beam 24. A slider 32 that constitutes a magnetic head is provided on the front part of the flexure 31.

The base plate 22 is formed of a metal plate with a thickness of, for example, about 200 $\mu$m. As shown in FIG. 2, the base plate 22 is formed integrally with a circular boss hole 40, bisymmetrical slits 41 and 42, a pivot portion 43 situated between the slits 41 and 42, a movable portion 44 swingable in the sway direction (indicated by arrow S in FIG. 1) around the pivot portion 43, etc.

One end portion 30a of each actuator element 30 is bonded to the movable portion 44 of the base plate 22. The other end portion 30b of each actuator element 30 is bonded to a main portion 22a of the base plate 22. If the paired actuator elements 30 are displaced in opposite directions, therefore, the movable portion 44 is displaced in the sway direction around the pivot portion 43 depending on the directions of displacement of the elements 30. In this embodiment, the base plate 22 functions as an actuator base. The base plate 22 may be formed integrally with a boss portion 45. Alternatively, a part for boss portion may be attached to a base plate.

The connecting plate 23 is formed of a springy metal plate with a thickness of, for example, about 40 $\mu$m. The plate 23 integrally has a main plate portion 50 fixedly superposed on the main portion 22a of the base plate 22, a slit 51 situated corresponding to the slits 41 and 42 of the base plate 22, a pair of support walls 52 situated individually on the opposite ends of the slit 51, and a movable portion 53 connected to the main plate portion 50 by means of the walls 52. The movable portion 53 is formed having a hole 54 that serves to lower the bending stiffness in the thickness direction. Formed individually on the opposite sides of the hole 54 are hinge portions 55 that can bend in the thickness direction.

The main plate portion 50 of the connecting plate 23 is fixed to the main portion 22a of the base plate 22 by laser welding or the like. In FIG. 1, symbol P1 designates welds for this fixation. The movable portion 53 of the connecting plate 23 is fixed to the movable portion 44 of the base plate 22 by laser welding or the like. In FIG. 1, symbol P2 designates welds for this fixation. The distal end portion of the movable portion 53 is fixed to the load beam 24 by laser welding or the like. In FIG. 1, symbol P3 designates welds for this fixation.

Figure 21:
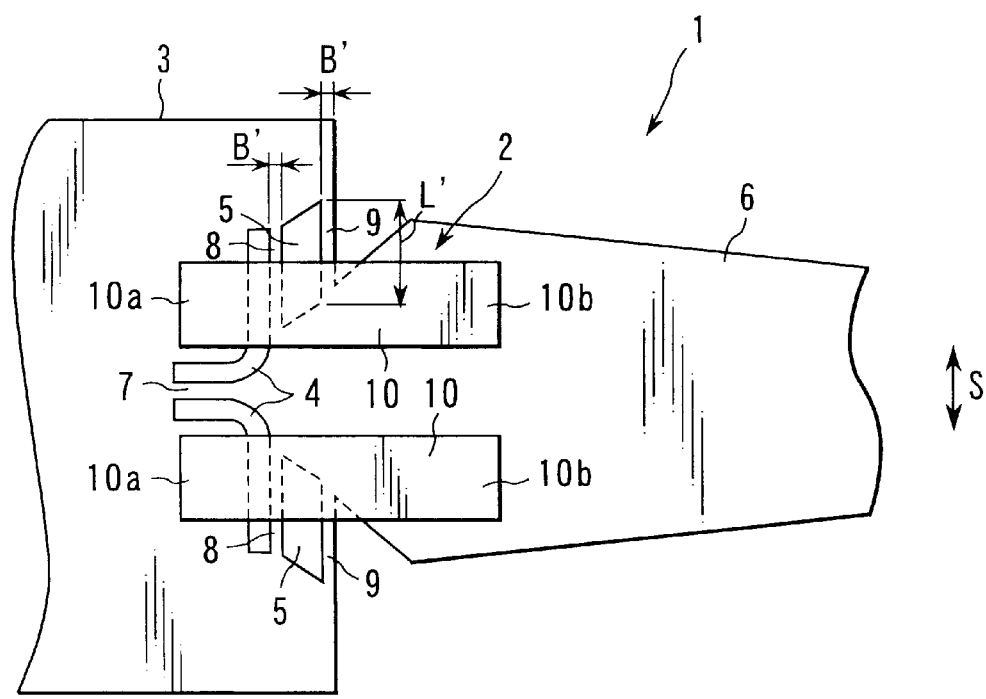
FIG. 21 is a plan view of a micro actuator mechanism of a conventional suspension.

As shown in FIG. 5, each support wall 52 is composed of a bent portion 56 that is formed by raising the front end portion of the connecting plate 23 substantially at right angles (about 90°) to the thickness direction. Thus, a thickness H of the support wall 52 is equal to the bending height of the bent portion 56. This bending height can be made greater enough than the thickness of the support wall (shown in FIG. 21) of the conventional actuator portion. Accordingly, the torsional stiffness and resonance frequency of the support wall 52 can be made higher than in the conventional case.

A width B of each support wall 52 is equal to the thickness of the bent portion 56. The connecting plate 23 itself is as thin as about 40 $\mu$m. Accordingly, the support wall 52 can be made thinner enough than the support wall (shown in FIG. 21) of the conventional actuator portion. Consequently, the stiffness in the sway direction can be lowered, so that the support wall 52 can be easily displaced in the sway direction. Thus, the direction of a displacement obtained when the elements 30 are energized can be effectively converted into the sway direction of the load beam 24. A length L of the support wall 52 can be suitably set depending on the length of the bent portion 56.

When the actuator elements 30 are supplied with current, in the suspension 20A having the pivot-type micro actuator mechanism 21 described above, they are displaced in opposite directions. Their respective displacements cause distal end portion of the load beam 24 or vicinity of the slider 32 to move in the sway direction around the pivot portion 43. As this is done, the support walls 52 bend. The load beam 24 may be formed of a light alloy, such as aluminum alloy, or cladding material composed of a light alloy and stainless steel so that its weight is reduced.

A suspension 20B according to a second embodiment of the present invention will now be described with reference to FIGS. 6 to 11. In the description of the suspension 20B to follow, common reference numerals are used to designate common portions of the suspensions 20A and 20B of the first and second embodiments, and a description of those portions is omitted.

Figure 8:
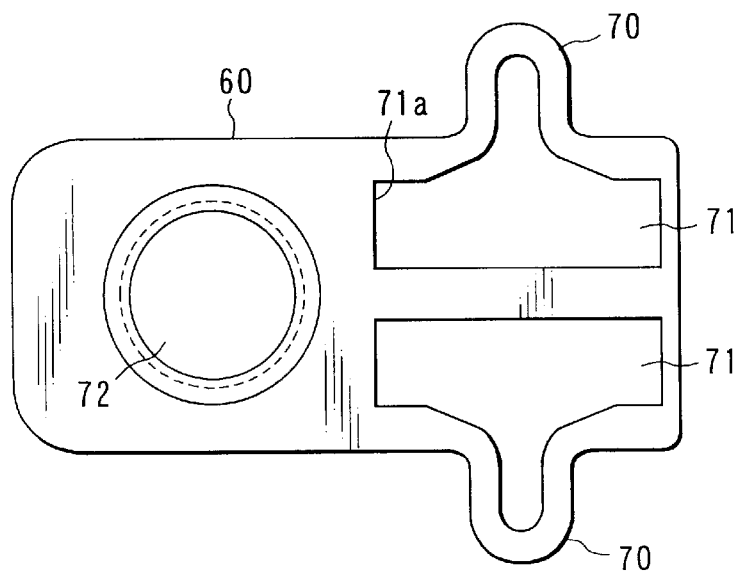
FIG. 8 is a plan view of a base plate used in the suspension shown in FIG. 6.
Figure 9:
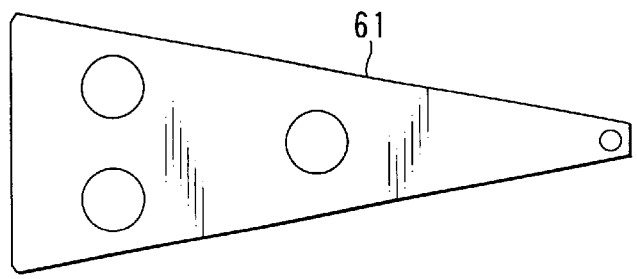
FIG. 9 is a plan view of a load beam used in the suspension shown in FIG. 6.
Figure 10:
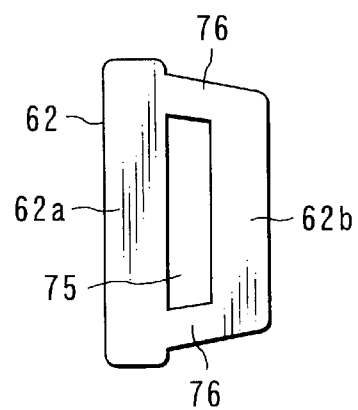
FIG. 10 is a plan view of a connecting plate used in the suspension shown in FIG. 6.

The suspension 20B shown in FIG. 6 comprises a base plate 60 shown in FIG. 8, a load beam 61 shown in FIG. 9, a connecting plate 62 that serves also as a hinge member shown in FIG. 10, a support plate 63 shown in FIG. 7, a bending-type micro actuator mechanism 64, etc. The micro actuator mechanism 64 is provided with a pair of actuator elements 30 such as PZT. In this embodiment, the base plate 60 serves as an actuator base.

The base plate 60, which is formed of a metal plate with a thickness of, for example, about 200 $\mu$m, includes a pair of U-shaped flexible portions 70, right and left, apertures 71 capable of storing the actuator elements 30, and a circular boss hole 72. The flexible portions 70 are curved so that they project outward in positions corresponding individually to side faces 30c of the actuator element 30.

The connecting plate 62 is formed of a springy metal plate with a thickness of about 40 $\mu$m. A hole 75 that serves to lower the bending stiffness in the thickness direction is formed in a part of the connecting plate 62. Formed individually on the opposite sides of the hole 75 are hinge portions 76 that can bend in the thickness direction. A one-end-side portion 62a of the connecting plate 62 is put on the reverse side of the base plate 60 and fixed to the plate 60 by laser welding or the like. In FIG. 6, symbol P4 designates welds for this fixation. The other-end-side portion 62b of the connecting plate 62 is put on an end portion of the load beam 61 and fixed to the beam 61 by laser welding or the like. In FIG. 6, symbol P5 designates welds for this fixation. The support plate 63 is also put on the reverse side of the base plate 60 and fixed to the plate 60 by laser welding or the like. In FIG. 6, symbol P6 designates welds for this fixation.

Figure 11:
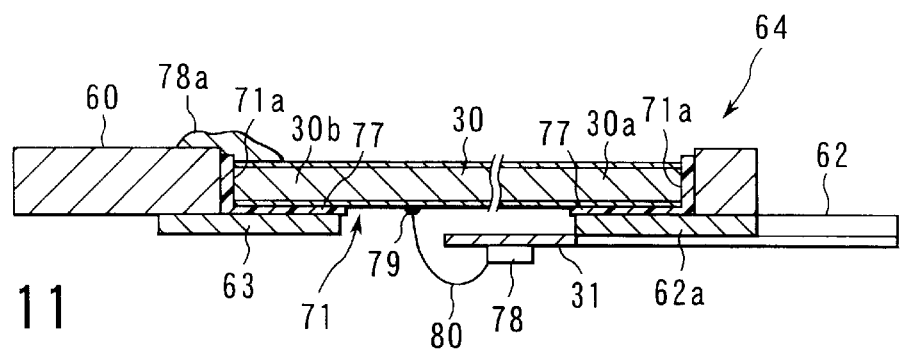
FIG. 11 is a sectional view of a part of the suspension taken along line F11—F11 of FIG. 7.

As shown in FIG. 11, the actuator elements 30 are stored in the apertures 71 in the base plate 60 that serves as the actuator base. Provided between the actuator elements 30, base plate 60, and connecting plate 62 are adhesive layers 77 that serve also as electric insulating layers with a suitable thickness. The one end portion 30a of each actuator element 30 is bonded to the one-end-side portion 62a of the connecting plate 62 by the adhesive layers 77. The other end portion 30b of each actuator element 30 is bonded to the support plate 63 by the adhesive layers 77. The adhesive must be filled between the element 30 and inner surfaces of the aperture 71 of the actuator base. By doing this, distortion (displacement) can be transmitted effectively from the element 30 to the load beam 61, and electric insulation between end faces and side faces of the element 30 and the actuator base can be obtained effectively by the adhesive. Numeral 78a denotes an Ag-paste.

Each actuator element 30 is located in a given position by means of an inner peripheral surface 71a of its corresponding aperture 71. The position of each actuator element 30 in the thickness direction is regulated by the portion 62a of the connecting plate 62 and the support plate 63. In consequence, a wiring portion 78 of a flexure 31 and a connector portion 79 of each actuator element 30 are exposed on the same side, as shown in FIG. 11. There is a small difference in height between the wiring portion 78 and the connector portion 79. One end of a conductive member, such as a bonding wire 80, is connected to the wiring portion 78 of the flexure 31 by means of soldering or by means of ultrasonic waves. The other end of the bonding wire 80 is connected to the connector portion 79 of each actuator element 30 by soldering or by means of ultrasonic waves.

Figure 12:
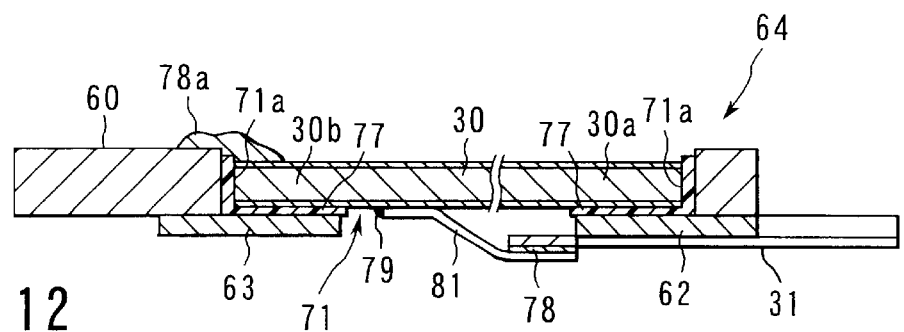
FIG. 12 is a sectional view of a part of a suspension according to a third embodiment of the invention.
Figure 13:
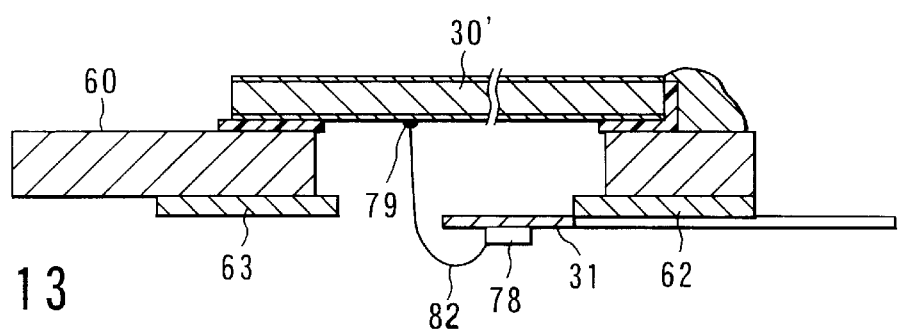
FIG. 13 is a sectional view of a part of a suspension having actuator elements on a base plate.

As in the case of a third embodiment shown in FIG. 12, a conductive member, such as a flying lead 81, may be used in place of the bonding wire 80. FIG. 13 shows an actuator element 30' of an overlay type that is bonded to the upper surface of a base plate 60. In the case of the overlay-type element 30', there is a substantial difference in height between a wiring portion 78 of a flexure 31 and a connector portion 79 of the element 30', so that a considerably long conductive member 82 is needed. In the case of the suspension shown in FIG. 11 or 12, compared with a suspension that uses this overlay-type element 30', the bonding wire 80 or the flying lead 81 need not be long, and wiring operation is easy.

In the cases of the actuator elements 30 of an embedded type shown in FIGS. 11 and 12, compared with the overlay-type element 30' shown in FIG. 13, their configuration is substantially symmetrical with respect to the thickness-direction center of the micro actuator mechanism 64. Accordingly, the movement of the actuator elements 30 can be transmitted fully to the load beam 61 as the elements 30 are activated. Thus, the displacement of the elements 30 can be used effectively, and the sway-direction displacement can be increased.

Figure 14:
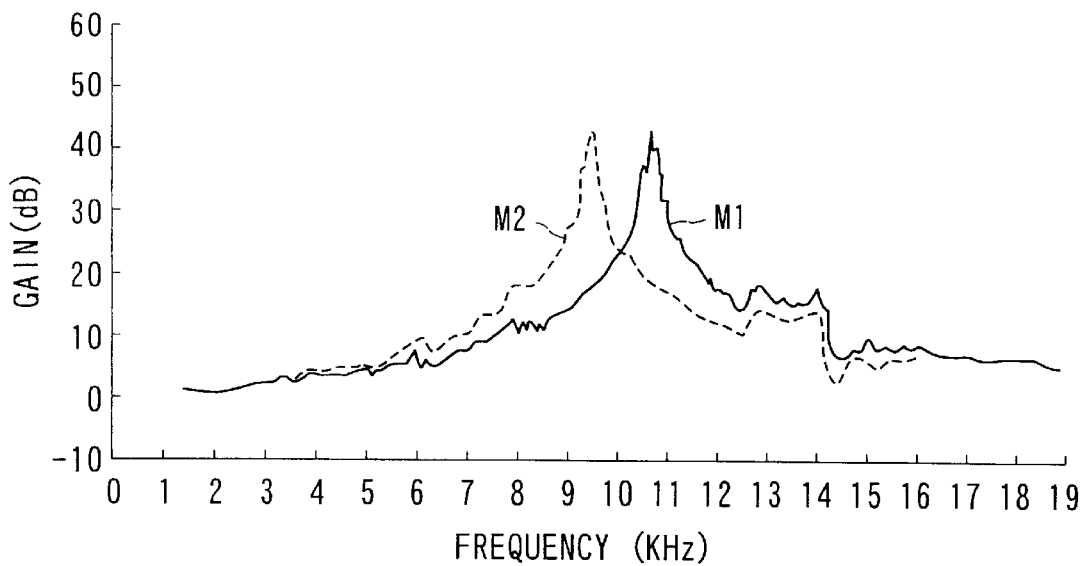
FIG. 14 is a diagram showing the sway-direction movement of the suspension caused when the base plate is oscillated.

In FIG. 14, full line M1 represents the result of measurement of the sway-direction movement of the slider 32 caused when the base plate 60 or the actuator elements 30 of the suspension 20B is oscillated. Broken line M2 represents the result of measurement of the sway-direction movement of a slider of the suspension that has the overlay-type elements 30' shown in FIG. 13. As seen from FIG. 14, the frequency at which the suspension 20B with the embedded-type elements 30 has its resonance peak is higher than the frequency at which the suspension with the overlay-type elements 30' has its resonance peak.

Figure 15:
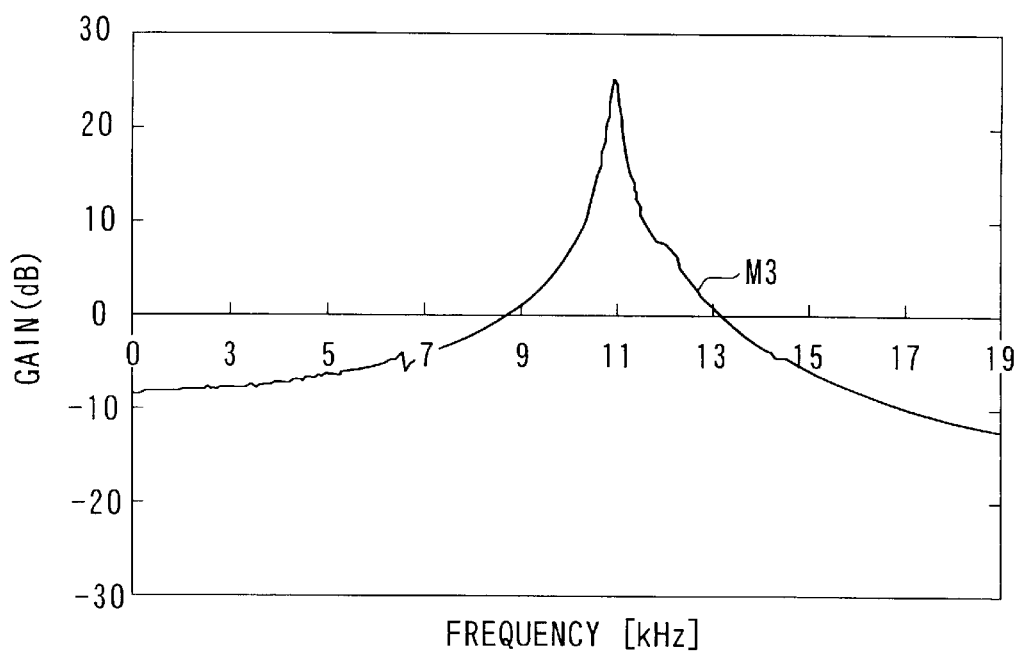
FIG. 15 is a diagram showing the sway-direction movement of the suspension caused when the actuator elements are activated.

In FIG. 15, full line M3 represents the result of measurement of the sway-direction movement of the slider 32 caused when the actuator elements 30 of the suspension 20B of the invention are activated. In this case also, the frequency at which the suspension 20B with the embedded-type elements 30 has its resonance peak is high as in case of FIG. 14.

The bending-type micro actuator mechanism 64 that is attached to the suspension 20B described above, unlike the pivot-type micro actuator mechanism 21 of the suspension 20A of the first embodiment, is designed so that the entire suspension bends in the sway direction. Accordingly, the torsional stiffness of the micro actuator mechanism 64 of the suspension 20B is higher than that of the pivot-type micro actuator mechanism 21. Further, in the suspension 20B that has the bending-type micro actuator mechanism 64, compared with the suspension having the pivot-type micro actuator mechanism 21, the actuator elements 30 are subjected to lighter load. Thus, in the bending-type micro actuator mechanism 64, compared with the pivot-type micro actuator mechanism 21, the actuator elements 30 can be broken less easily when they are shocked.

In the suspension 20B according to the foregoing embodiment, the lower surface of each embedded-type actuator element 30 is supported by means of the connecting plate 62 and the support plate 63. Further, each element 30 is surrounded substantially throughout the circumference by the base plate 60. Accordingly, the actuator elements 30 can be easily positioned as they are bonded, and can be prevented from being damaged. Thus, in the bending-type micro actuator mechanism 64, the fragile elements 30 can be protected.

Figure 20:
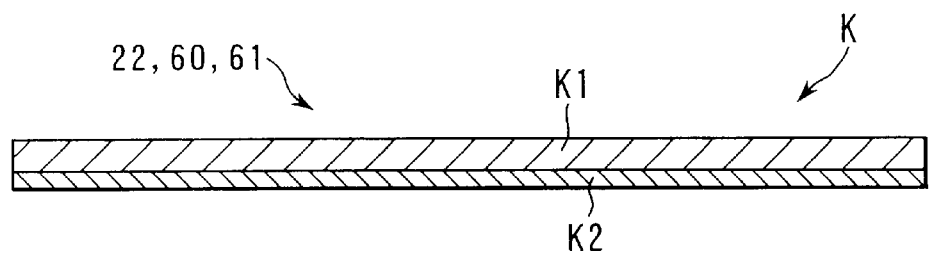
FIG. 20 is a sectional view of a base plate formed of a cladding material.

The base plate 22 and 60 or the load beam 61 may be formed of a light alloy, such as aluminum alloy, or cladding material K of a light alloy K1 and stainless steel K2, as shown in FIG. 20, so that its weight is reduced.

Figure 18:
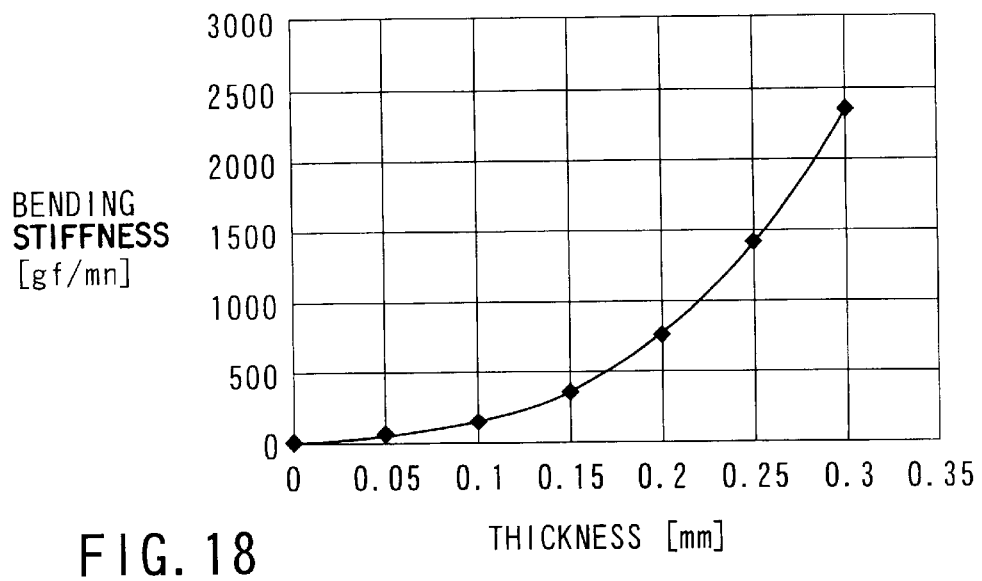
FIG. 18 is a diagram showing the relation between the thickness of the base plate and the bending stiffness of the micro actuator mechanism.
Figure 19:
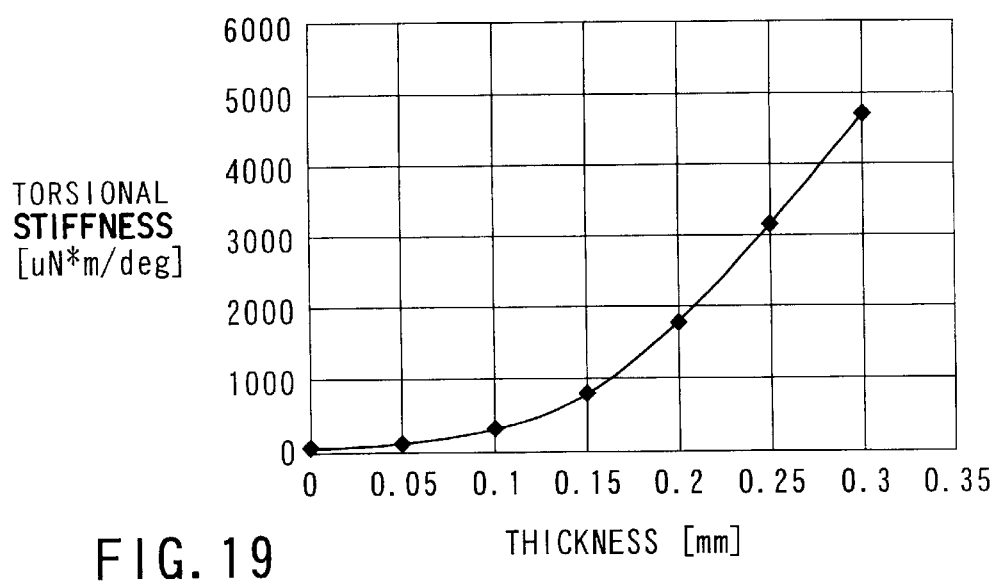
FIG. 19 is a diagram showing the relation between the thickness of the base plate and the torsional stiffness of the micro actuator mechanism.

The respective thicknesses of the base plates 22 and 60 are important parameters for the enhancement of the stiffness of the micro actuator mechanisms 21 and 64 of the suspensions 20A and 20B. More specifically, in the suspension 20B of the second embodiment, the stiffness increases suddenly in the region where the plate thickness ranges from about 0.15 mm to 0.17 mm, as shown in FIGS. 18 and 19. Preferably, the thickness of each of the base plates 22 and 60 should be adjusted to 0.17 mm or more so that the stiffness of the micro actuator mechanisms 21 and 64 can be increased.

FIG. 16 shows a suspension 20C according to a fourth embodiment of the present invention. A load beam 61 of the suspension 20C is thinner than the load beam 61 (e.g., 100 μm thick) of the second embodiment. Thus, the inertia of the load beam 61 of the suspension 20C is lowered. The thickness of the load beam 61 is about 50 μm, for example. A distal end portion 60a of the base plate 60 and a rear end portion 61a of the load beam 61 are fixed to each other by laser welding or the like.

In the suspension 20C of the fourth embodiment, moreover, bent edges 90 are formed individually on the opposite side portions of the load beam 61 in order to increase the rigidity of the beam 61. Further, a damper 91 is attached to the load beam 61, whereby the influence of air turbulence is restrained. A micro actuator mechanism 64 is constructed in the same manner as the one according to the second embodiment (FIGS. 6 to 11). By reducing the weight of the distal end portion of the suspension 20C in this manner, the sway-direction resonance frequency can be adjusted to 10 to 11 kHz or more.

A base plate 60 may be formed of a light alloy, such as aluminum alloy, or a cladding material K of a light alloy K1 and stainless steel K2, as shown in FIG. 20, so that its weight is reduced.

In a suspension 20D of a fifth embodiment shown in FIG. 17, a base plate 100 of a long-mount type, which serves also as an actuator arm, is provided integrally with the bending-type micro actuator mechanism 64 (FIGS. 6 to 11). A hole 101 for the passage of a turning shaft (not shown) of a voice coil motor unit is formed in the proximal portion of the base plate 100. In the suspension 20D, the base plate 100 and the micro actuator mechanism 64 can be formed integrally with each other. The base plate 100 may be formed of aluminum alloy or a cladding material of aluminum alloy and stainless steel. Although the use of the cladding material results in an increase in the plate thickness, the displacement of the actuator can be secured and the resonance frequency of the load beam 61 can be increased with use of the bending-type micro actuator mechanism 64.

It is to be understood that the present invention is not limited to the embodiments described above, and that various changes and modifications may be effected therein by one skilled in the art without departing from the scope or spirit of the invention. The modifications include, for example, changes of the specific shapes and constructions of the base plate, load beam, flexure, connecting plate, actuator elements of the micro actuator mechanism, pivot portion, support walls, etc. and the shape of the apertures for the embedded-type actuator elements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive, comprising:
    an actuator base including a base place having first and second side portions, an integrally formed boss-portion and apertures formed in the base plate;
    a load beam provided with a flexure; and
    a micro actuator mechanism attached to the actuator base, the micro actuator mechanism including:
        actuator elements respectively provided in the apertures, each of which has a portion corresponding to a side face along a longitudinal direction of a respective actuator element and portions corresponding to end faces of the respective actuator element, each actuator element being adapted to be distorted to cause displacement of a distal end portion of the load beam when supplied with current;
    wherein the suspension further comprises supporting portions for supporting the end faces of each paid actuator element in said apertures respectively; and
    wherein the base plate includes outwardly convex flexible portions located to respectively correspond to the side face of a respective actuator element at the first and second side portions of the base plate.

2. A suspension for a disc drive according to claim 1, which further comprises a springy connecting plate for operatively connecting the base plate and the load beam, the connecting plate including a hinge portion flexible in a thickness direction between the base plate and the load beam.

3. A suspension for a disc drive according to claim 1, wherein at least one of said end faces of each said actuator element is supported by said load beam.

4. A suspension for a disc drive according to claim 2, wherein at least one of said end faces of each said actuator element is supported by said connecting plate.

5. A suspension for a disc drive according to claim 1, wherein said base plate is formed of a cladding material including a light metal and a stainless steel.

6. A suspension for a disc drive according to claim 1, which further comprises a conductive member for electrically connecting a wiring portion on the flexure and a connector portion of the actuator element.

7. A suspension for a disc drive, comprising:
    an actuator base including a base plate of a long-mount type and apertures formed in the base plate, the base plate having first and second side portions;
    a load beam provided with a flexure; and
    a micro actuator mechanism attached to the actuator base, the micro actuator mechanism including:
        an actuator element respectively provided in each of the apertures, each of which has a portion corresponding to a side face along a longitudinal direction of the actuator element and portions corresponding to end faces of the actuator element, the actuator element being adapted to be distorted to cause displacement of a distal end portion of the load beam when supplied with current;
    wherein the suspension further comprises supporting portions for supporting the end faces of said actuator element in a respective one of said apertures and
    wherein the base plate includes outwardly convex flexible portions located to respectively correspond in position to the side of the actuator element at one of the first and second side portions of the base plate.

8. A suspension for a disc drive according to claim 7, which further comprises a springy connecting plate for operatively connecting the base plate and the load beam, the connecting plate including a hinge portion flexible in a thickness direction between the base plate and the cad beam.

9. A suspension for a disc drive according to claim 7, wherein at least one of said end faces of said actuator element is supported by said load beam.

10. A suspension for a disc drive according to claim 8, wherein at least one of said end faces of said actuator element is supported by said connecting plate.

11. A suspension for a disc drive according to claim JA, wherein said base plate is formed of a cladding material including a light meal and a stainless steel.

12. A suspension for a disc drive according to claim 7, which further comprises a conductive member for electrically connecting a wiring portion on the flexure and a connector portion of the actuator element.

13. A suspension for a disk drive, comprising:
    an actuator base including a base plate;
    a load beam including a flexure; and
    a micro actuator mechanism attached to the actuator base, the micro actuator mechanism including:
        at least a pair of first slits formed in the base plate, a pivot portion between the first slits, an actuator element provided on the actuator baser and adapted to be distorted to cause displacement of a distal end portion of the load beam when supplied with current, and a connecting plate for connecting the actuator base and the load beam, the connecting plate being formed as a member separate from the base plate and the load beam, the connecting plate including (i) a main plate portion which is formed of plate material thinner than the base plate, and superposed on the base plate, (ii) a support wall comprising a bent portion which is upright at an edge portion of the main plate portion in a thickness direction of the main plate portion and which is formed at a location nearer to the load beam than to the pivot portion, and a curved portion formed between the bent portion and the main plate position, (iii) a springy hinge portion which is flexible in the thickness direction between the base plate and the load beam, and (iv) a second alit formed to correspond to the first slits.

14. A suspension for a disc drive, comprising:

an actuator base including a base plate, having first and second side portions, an integrally formed boss portion, and apertures formed in the base plate;

a load beam provided with a flexure; and a micro actuator mechanism attached to the actuator base, the micro actuator mechanism including:

actuator elements respectively provided in the apertures, each of which has a portion corresponding to a side face along a longitudinal direction of a respective actuator element and portions corresponding to end faces of a respective actuator element, each actuator element being placed at a middle portion in a thickness direction of the base plate, and adapted to be distorted to cause displacement of a distal end portion of the load beam when supplied with current;

wherein at least one of said and faces of said actuator element is supported in the apertures by a connecting plate; and wherein the base plate includes outwardly convex flexible portions located to respectively correspond to the side face of a respective actuator element at the first and second side portions of the base plate.

15. A suspension for a disc drive according to claim 14, which further comprises a conductive member for electrically connecting a wiring portion on the flexure and a connector portion of the actuator elements.

16. A suspension for a disc drive, comprising:

an actuator base including a base plate of a long-mount type and apertures formed in the base plate, the base plate having first and second side portions;

a load beam provided with a flexure; and a micro actuator mechanism attached to the actuator base, the micro actuator mechanism including:

an actuator element respectively fitted in each of the apertures, each of which has a portion corresponding to a side face along a longitudinal direction of the actuator element and portions corresponding to end faces of the actuator element, each actuator element being placed at a middle portion in a thickness direction of the base plate, and adapted to be distorted to cause displacement of a distal end portion of the load beast when supplied with current;

wherein at least one of said end faces of each said actuator element is supported in the apertures by a connecting plate; and wherein the base includes outwardly convex flexible portions located to respectively correspond in position to the side face of a respective actuator element at the first and second side portions of the base plate.

17. A suspension for a disc drive according to claim 16, which further comprises a conductive member for electrically connecting a wiring portion on the flexure and a connector portion of the actuator element.

* * * * *